US010253759B2

(12) United States Patent
Souryal

(10) Patent No.: US 10,253,759 B2
(45) Date of Patent: *Apr. 9, 2019

(54) ENERGY COLLECTION POD

(71) Applicant: Tarek O. Souryal, Dallas, TX (US)

(72) Inventor: Tarek O. Souryal, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/683,705

(22) Filed: Aug. 22, 2017

(65) Prior Publication Data

US 2018/0283357 A1 Oct. 4, 2018

Related U.S. Application Data

(63) Continuation of application No. 15/472,725, filed on Mar. 29, 2017, now Pat. No. 9,784,244.

(51) Int. Cl.
| *F03D 1/02* | (2006.01) |
| *F03D 1/04* | (2006.01) |
| *F03D 1/06* | (2006.01) |
| *F03D 9/11* | (2016.01) |
| *H02J 7/00* | (2006.01) |
| *H02J 7/14* | (2006.01) |
| *H02K 7/18* | (2006.01) |
| *H02J 7/32* | (2006.01) |

(52) U.S. Cl.
CPC .......... *F03D 9/11* (2016.05); *F03D 1/02* (2013.01); *F03D 1/04* (2013.01); *F03D 1/065* (2013.01); *H02J 7/0013* (2013.01); *H02J 7/1415* (2013.01); *H02K 7/1838* (2013.01); *F05B 2240/133* (2013.01); *F05B 2240/40* (2013.01); *H02J 7/32* (2013.01); *Y02E 10/721* (2013.01)

(58) Field of Classification Search
USPC .......................... 290/44, 52, 54, 55
See application file for complete search history.

(56) References Cited

U.S. PATENT DOCUMENTS

| 2,169,165 A | 8/1939 | Reedy | |
| 3,986,787 A * | 10/1976 | Mouton, Jr. | ............ F03B 11/02 |
| | | | 415/7 |
| 4,102,599 A | 7/1978 | Ziegler | |
| 4,163,904 A * | 8/1979 | Skendrovic | ............. F03B 13/10 |
| | | | 277/369 |

(Continued)

FOREIGN PATENT DOCUMENTS

| DE | 202008000482 U1 | 8/2008 |
| JP | 2007332947 A | 12/2007 |
| WO | 2016059612 A1 | 4/2016 |

OTHER PUBLICATIONS

Souryal, System and Method for Efficiently Harnessing and Converting Aircraft Exhaust to Electrical Power, U.S. Appl. No. 12/062,921, filed Apr. 4, 2008.

(Continued)

*Primary Examiner* — Pedro J Cuevas

(57) ABSTRACT

This disclosure provides an apparatus, system and method for an energy capturing pod (ECP). The ECP includes a specialized funnel shell, a first turbine, and a second turbine. The specialized funnel shell is designed to accelerate in coming wind speed and is structured with a first choke point and a second choke point for wind. The first turbine is located at the first choke point. The second turbine is located at the second choke point.

20 Claims, 8 Drawing Sheets

(56) References Cited

U.S. PATENT DOCUMENTS

| | | | |
|---|---|---|---|
| 4,219,303 A * | 8/1980 | Mouton, Jr. | F03B 17/061 415/123 |
| 4,261,171 A * | 4/1981 | Atencio | F03B 13/10 290/53 |
| 4,275,989 A * | 6/1981 | Gutierrez Atencio | F03B 3/103 415/129 |
| 4,289,971 A * | 9/1981 | Ueda | F03B 13/08 290/52 |
| 4,320,304 A * | 3/1982 | Karlsson | F03D 1/04 290/55 |
| 4,352,989 A * | 10/1982 | Gutierrez Atencio | F03B 13/08 290/53 |
| 4,424,452 A | 1/1984 | Francis | |
| 4,509,925 A * | 4/1985 | Wuhrer | B63H 5/14 415/221 |
| 4,516,907 A | 5/1985 | Edwards | |
| 4,600,360 A * | 7/1986 | Quarterman | F03D 1/04 415/148 |
| 4,789,302 A * | 12/1988 | Gruzling | B63H 5/14 415/221 |
| 5,040,945 A | 8/1991 | Levesque | |
| 5,440,176 A * | 8/1995 | Haining | F03B 13/10 290/42 |
| 5,998,882 A | 12/1999 | Alston | |
| 6,100,600 A | 8/2000 | Pflanz | |
| 6,749,399 B2 | 6/2004 | Heronemus | |
| 6,755,608 B2 * | 6/2004 | Boughton | F03D 1/04 415/4.5 |
| 6,981,839 B2 | 1/2006 | Fan | |
| 7,116,005 B2 | 10/2006 | Corcoran, III | |
| 7,256,512 B1 * | 8/2007 | Marquiss | F03D 1/04 290/55 |
| 7,285,871 B2 | 10/2007 | Derouineau | |
| 7,293,960 B2 | 11/2007 | Yamamoto et al. | |
| 7,471,009 B2 * | 12/2008 | Davis | F03B 3/128 290/43 |
| 7,528,498 B2 | 5/2009 | Yeh | |
| 7,640,897 B2 | 1/2010 | Gandrud et al. | |
| 7,713,020 B2 * | 5/2010 | Davidson | F03B 3/183 415/1 |
| 7,728,455 B2 | 6/2010 | Branco | |
| 7,745,950 B2 | 6/2010 | Lueck | |
| 7,758,300 B2 | 7/2010 | Friesth | |
| 7,768,145 B2 * | 8/2010 | Susman | F03B 13/264 290/43 |
| 7,804,186 B2 | 9/2010 | Freda | |
| 7,874,788 B2 | 1/2011 | Stothers et al. | |
| 7,944,073 B2 * | 5/2011 | Van Drentham Susman | F03B 13/264 290/43 |
| 8,022,567 B2 * | 9/2011 | Davis | F03B 3/128 290/54 |
| 8,072,091 B2 | 12/2011 | Wilson et al. | |
| 8,089,173 B2 | 1/2012 | Freda | |
| 8,120,197 B2 | 2/2012 | Branco | |
| 8,177,479 B2 * | 5/2012 | Watts | B60K 16/00 415/4.1 |
| 8,178,990 B2 | 5/2012 | Freda | |
| 8,253,265 B2 * | 8/2012 | Glass | F03D 1/04 290/55 |
| 8,310,077 B2 | 11/2012 | Pearce | |
| 8,358,023 B2 | 1/2013 | West | |
| 8,395,276 B2 | 3/2013 | Freda | |
| 8,482,146 B2 | 7/2013 | Freda | |
| 8,587,144 B2 * | 11/2013 | Urch | F03B 17/061 290/54 |
| 8,598,730 B2 | 12/2013 | Freda | |
| 8,668,433 B2 | 3/2014 | Friesth et al. | |
| 8,736,098 B2 | 5/2014 | Choi et al. | |
| 8,834,093 B2 * | 9/2014 | Cucci | F03D 3/02 415/4.1 |
| 8,884,456 B2 | 11/2014 | West et al. | |
| 8,890,354 B2 | 11/2014 | Casasanta, III | |
| 8,937,399 B2 | 1/2015 | Freda | |
| 9,000,605 B2 * | 4/2015 | Glass | F03D 1/04 290/55 |
| 9,097,233 B1 * | 8/2015 | Ramsey | F03B 17/061 |
| 9,284,850 B1 | 3/2016 | Gardner et al. | |
| 9,567,866 B2 | 2/2017 | Gardner et al. | |
| 9,709,028 B2 | 7/2017 | Freda | |
| 9,765,647 B2 * | 9/2017 | Ives | F03B 13/264 |
| 2001/0004439 A1 | 6/2001 | Bolcich et al. | |
| 2002/0114692 A1 * | 8/2002 | Boughton | F03D 1/04 415/4.5 |
| 2003/0133782 A1 * | 7/2003 | Holter | F03D 3/005 415/4.2 |
| 2003/0193198 A1 | 10/2003 | Wobben | |
| 2005/0001432 A1 * | 1/2005 | Drentham Susman | F03B 13/264 290/43 |
| 2005/0123390 A1 | 6/2005 | Lamont | |
| 2005/0249579 A1 | 11/2005 | Grubb | |
| 2006/0138782 A1 | 6/2006 | Friesth | |
| 2006/0171798 A1 | 8/2006 | Yamamoto et al. | |
| 2007/0009348 A1 | 1/2007 | Chen | |
| 2008/0048453 A1 * | 2/2008 | Amick | B82Y 30/00 290/44 |
| 2008/0093861 A1 | 4/2008 | Friesth et al. | |
| 2008/0191486 A1 | 8/2008 | Sugano | |
| 2008/0258467 A1 | 10/2008 | Wilson et al. | |
| 2008/0265583 A1 * | 10/2008 | Thompson | F01D 5/141 290/54 |
| 2009/0045632 A1 | 2/2009 | Krauss | |
| 2009/0115193 A1 | 5/2009 | Branco | |
| 2009/0146435 A1 | 6/2009 | Freda | |
| 2009/0185905 A1 | 7/2009 | Farb | |
| 2009/0250936 A1 | 10/2009 | Souryal | |
| 2010/0007148 A1 | 1/2010 | Davis et al. | |
| 2010/0032955 A1 | 2/2010 | Chen | |
| 2010/0034649 A1 | 2/2010 | Taylor | |
| 2010/0066089 A1 | 3/2010 | Best et al. | |
| 2010/0090473 A1 * | 4/2010 | Glass | F03D 1/04 290/55 |
| 2010/0102566 A1 | 4/2010 | West et al. | |
| 2010/0133844 A1 | 6/2010 | Pearce | |
| 2010/0150718 A1 | 6/2010 | Freda | |
| 2010/0237620 A1 | 9/2010 | West | |
| 2010/0310361 A1 | 12/2010 | Carre | |
| 2011/0049904 A1 | 3/2011 | Freda | |
| 2011/0229322 A1 * | 9/2011 | Tadayon | F03D 1/065 416/91 |
| 2012/0057974 A1 | 3/2012 | Freda | |
| 2012/0193923 A1 | 8/2012 | Freda | |
| 2012/0319407 A1 * | 12/2012 | Glass | F03D 1/04 290/55 |
| 2013/0214539 A1 | 8/2013 | Freda | |
| 2013/0328530 A1 | 12/2013 | Beaston | |
| 2013/0334824 A1 | 12/2013 | Freda | |
| 2013/0341932 A1 | 12/2013 | Yudkovitz et al. | |
| 2015/0110599 A1 | 4/2015 | Freda | |
| 2015/0337676 A1 * | 11/2015 | Feng | F01D 15/10 290/52 |
| 2016/0079829 A1 | 3/2016 | Vera | |
| 2016/0251964 A1 | 9/2016 | Solorzano et al. | |

OTHER PUBLICATIONS

Foreign Communication from Related Counterpart Application; PCT Patent Application No. PCT/US2017/057585; International Search Report and Written Opinion of the International Searching Authority dated Jan. 3, 2018.

* cited by examiner

ENERGY COLLECTION POD

CROSS REFERENCE TO RELATED APPLICATIONS AND CLAIM OF PRIORITY

This application is a continuation of U.S. patent application Ser. No. 15/472,725, filed Mar. 29, 2017, which is hereby incorporated by reference.

TECHNICAL FIELD

This invention relates in general to capturing energy of wind power and solar power, more particularly, to systems and methods for capturing energy from high-speed manmade wind and light from the sun into electrical power.

BACKGROUND

The cost of oil and certain other energy resources continues to rise. There is also much concern regarding the environmental impact of the use of certain forms of energy. These are among the many factors that have led to an increased focus on the development of cheaper, cleaner, alternative forms of energy.

One alternative energy form is wind power, or more specifically the conversion of wind power to electric power. Windmills, or wind turbines may be used to receive the renewable resource of wind and convert the wind into a useful power supply, such as electricity. The electricity can then be delivered to a power grid. A single turbine can be deployed in a certain area. However, a more typical scenario is the creation of a wind farm, or a group of wind turbines, in an area that has relatively strong and steady prevailing winds. The turbines of the wind farm each generate their own power and the power is collectively distributed to a power grid.

SUMMARY

This disclosure provides an energy capturing pod (ECP) and related methods.

In a first embodiment, an ECP for capturing energy from wind is provided. The ECP includes a specialized funnel shell, a first turbine, and a second turbine. The specialized funnel shell is structured with a first choke point and a second choke point for wind. The first turbine is located at the first choke point. The second turbine is located at the second choke point.

In a second embodiment, an ECP system for capturing energy from wind is provided. The ECP system includes an ECP server and a plurality of ECPs. The ECP server monitors and controls the ECPs. Each ECP a specialized funnel shell, a first turbine, and a second turbine. The specialized funnel shell is structured with a first choke point and a second choke point for wind. The first turbine is located at the first choke point. The second turbine is located at the second choke point.

In a third embodiment, a method is provided for controlling an ECP for capturing energy from wind is provided. The method includes increasing a speed of wind using a first choke point and a second choke point of a specialized funnel shell. The method also includes generating electrical energy from wind using a first turbine located at the first choke point and a second turbine located at the second choke point.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 9, discussed below, and the various embodiments used to describe the principles of the present disclosure in this patent document are by way of illustration only and should not be construed in any way to limit the scope of the disclosure.

Figure 1C:
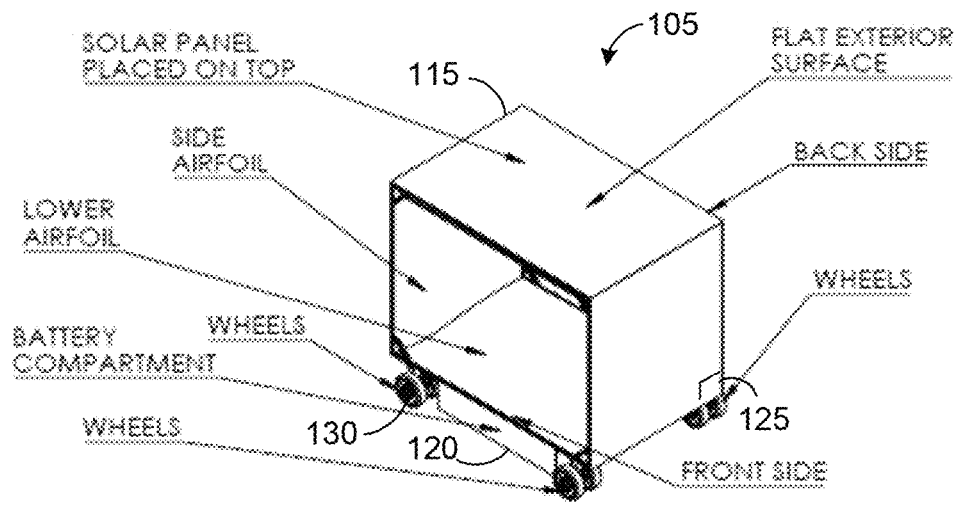
FIG. 1C illustrates a specialized funnel shell, with attached wheel, battery, and solar panel according to the various embodiments of the present disclosure.
Figure 1A:
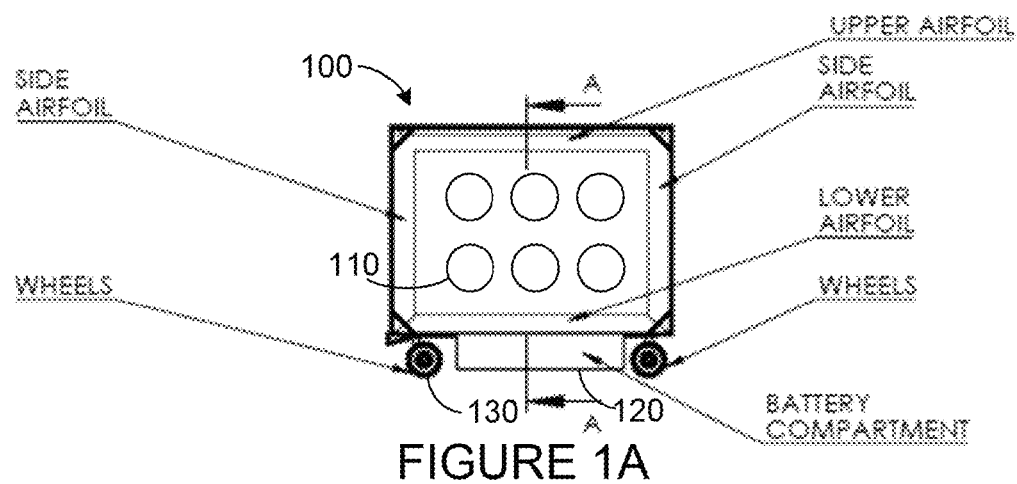
FIG. 1A illustrates an example energy capturing pod (ECP) according to this disclosure.
Figure 1B:
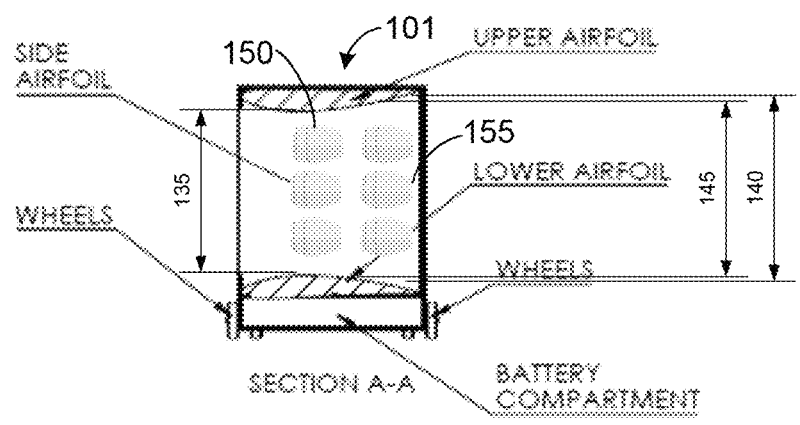
FIG. 1B illustrates a cross section of a specialized funnel shell of the ECP 100 according to the various embodiments of the present disclosure.

FIG. 1A illustrates an energy capturing pod (ECP) 100 according to the various embodiments of the present disclosure. FIG. 1B illustrates a cross section 101 of a specialized funnel shell 105 of the ECP 100 according to the various embodiments of the present disclosure. FIG. 1C illustrates a specialized funnel shell, with attached wheels, battery, and solar panel according to the various embodiments of the present disclosure. The embodiments of the ECP 100 illustrated in FIG. 1A, the cross section 101 illustrated in FIG. 1B, and the specialized funnel shell 105 illustrated in FIG. 1C are for illustration only. FIGS. 1A, 1B, and 1C do not limit the scope of this disclosure to any particular implementation of an ECP 100.

The ECP 100 is a transportable apparatus for generating electrical energy from wind energy and solar energy. The ECP 100 includes a wind increasing specialized funnel shell 105, a plurality of turbines 110, a plurality of solar panels 115, at least one battery 120, an energy transfer port 125, and a plurality of wheels 130. In certain embodiments, the ECP 100 includes a single specialized funnel shell 105 and a single turbine 110. The ECP 100 can be used on runways of airports to capture man-made wind power from the airplanes during both taxiing and takeoff. The ECP 100 can be placed at the ends of runways, at turns of the runway, along the edge of a runway, or any other location that experience significant wind energy from the high-speed man made winds. While the main embodiment focuses on capturing man-made wind power from airplanes, the ECP 100 can be used for any application that experiences focused wind energy, including railroads, tunnels, etc. For example, the ECP 100 can be place at the edge of a helipad to capture the wind energy that spreads outwards from the downward thrust of the propellers during takeoff and landing.

The specialized funnel shell 110 is designed to take advantage of the Venturi effect, air foil principles, and Bernoulli's principle to increase a velocity of the wind at a first choke 135 and a second choke 140. A front row 150 of turbines 110 are located towards the front of the ECP 100 at the first choke 135 and a second row 155 of turbines 110 are located towards the back of the ECP 100 at the regular choke 140. The first choke 135 is narrower than a portion 145 of the specialized funnel shell 110 located after the first choke 135. In other words the specialized funnel shell 110 narrows at the first choke and expands after the first choke 135. The turbines 110 are used to capture the wind energy. An ECP 100 can include any number of turbines 110. The specialized funnel shell 110 includes a horizontal top airfoil, a horizontal bottom airfoil, and two vertical side airfoils. At a neck of the specialized funnel shell 110, the horizontal top airfoil, the horizontal bottom airfoil, and the two vertical side airfoils are substantially linear along a width and a height, respectively, of the specialized funnel shell 110. Also at the neck of the specialized funnel shell 110, the horizontal top airfoil and the two vertical side airfoils meet as corners and the horizontal bottom airfoil and the two vertical side airfoils also meet as corners. The first row 150 of turbines 110 and the second row 155 of turbines 110 are independent turbines 110, where each turbine 110 is on a separate axle. A first acceleration occurs at the neck of the specialized funnel shell and a second acceleration occurs at a back of the specialized funnel shell.

The turbines 110 are used to capture the wind energy. An ECP 100 can include any number of turbines 110. The turbines 110 on an ECP 100 can have different gear ratios based on a suitable implementation. For example, the man-made wind power off the back of an airplane is focus at a downward angle. A higher gear ratio could be used for the turbines 110 at the bottom of the ECP 100 to capture the stronger man-made wind velocities experienced in this manner. The amount and placement of the turbines 110 can be maximized for different implementations based on the necessary gear ratios. The turbines 110 are manufactured with materials and components that withstand high wind speeds.

The turbines 110 on an ECP 100 can have different gear ratios based on a suitable implementation. For example, the man-made wind off the back of an airplane is focus at a downward angle. A higher gear ratio could be used for the turbines 110 at the bottom of the ECP 100 to capture the stronger man-made wind velocities experienced in this manner. The amount and placement of the turbines 110 can be maximized for different implementations based on the necessary gear ratios. The turbines 110 are manufactured with materials and components that withstand high wind speeds. For example, an ECP 100 positioned directly in line behind an engine of an airplane in takeoff requires a higher gear ratio for the turbine. The gear ratio of the turbine is based on the rotation of the rotor and the output of the generator. A high gear ratio is helpful for faster velocities of wind to keep the generator from exploding. The gear ratio allows the generator to capture more energy from the wind by requiring more energy to rotate the rotor. The ECP 100 can include a main turbine 110 in the center of the ECP 100, while encircled with turbines 110 with a smaller gear ratio. A cross section of the specialized funnel shell in the direction of the wind provides a shape of the walls with a curvature similar to the bottom of an aircraft wing.

The solar panels 115 are installed on the outer walls of the ECP 100. For cases where multiple ECPs 100 are used in a set or array, the solar panels 115 can be only mounted on the top of the ECP 100. The solar panels 115 collect energy from the sun. Because the efficiency of solar panels 115 drops drastically from indirect light, the solar panels 115 can be configured to rotate based on time of the day or based on detecting the greatest energy captured.

The battery 120 stores energy captured from both the turbines 110 and the solar panels 115. The ECP 100 can include both permanent and removable batteries 120. When a battery 120 is full, the ECP 100 provides a notification. For the case of the permanent battery 120, the ECP can be moved to a location to plug into the grid for distribution of the stored energy. For the case of the removable battery 120, the removable battery 120 is removed from the ECP 100 and taken to a battery rack to transfer the energy to the grid or for use internally at the airport. The ECP 100 can include a plurality of both permanent and removable batteries 120. The batteries 120 can charge evenly or be configured to charge one at a time. The batteries can be connected to a specific turbine 110, groups of turbines 110, solar panel 115, group of solar panels 115, or a combination of turbines and solar panels. For example, the batteries 120 can be set to receive energy captured by turbines 110 and solar panels 115 in a same row or column. The batteries 120 can be located at the base of the ECP 100, as illustrated, or any other position of the ECP 100. For example, the batteries 120 could be located on the side or back of the ECP 100 for easy access to exchange. The battery is designed to charge for twenty four hours of continuous operation. Where the continuous operation would be the largest wind speed caused by the man-made object or structure. Examples of batteries that could be used in an ECP 100 include lead acid batteries, lithium-ion batteries, flow batteries, nickel cadmium batteries, nickel iron batteries, etc.

The ECP 100 also includes at least one energy transfer port 125. The energy transfer port 125 can be used to connect multiple ECPs 100 in a set or array to transfer the captured energy. The energy transfer port 125 can be configured to receive energy from other ECPs or similar apparatuses or transmit energy of the ECP 100 to other ECPs 100 or similar apparatuses. For example, when an ECP 100 is included in an array of ECPs, the captured energy can be transmitted to neighboring ECPs 100 when a battery 120 is removed for transfer to the energy grid. Thus, the ECP 100 with a removed battery 120 can still store the capture energy in a neighbor ECP 100 battery 120. The ECP 100 could include an energy transfer port 125 on both sides. A cable could be inserted into the energy transfer port 125 of a first ECP 100 and the energy transfer port 125 of a neighboring ECP 100.

The ECP 100 also includes a plurality of retractable wheels 130 for transportability purposes. The retractable wheels 130 could face the front, as illustrated, or sideways. The benefit to placing the retractable wheels 130 sideways would decrease the chance of movement due to the wind energy being captured. In other terms, the wind energy would blow in a perpendicular direction to the movement path.

Figure 2A:
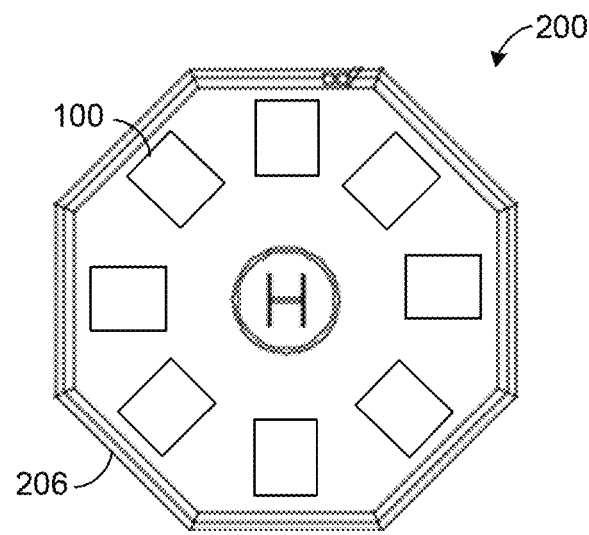
FIG. 2A illustrates an example placement of ECPs around a helipad according to the various embodiments of the present disclosure.
Figure 2B:
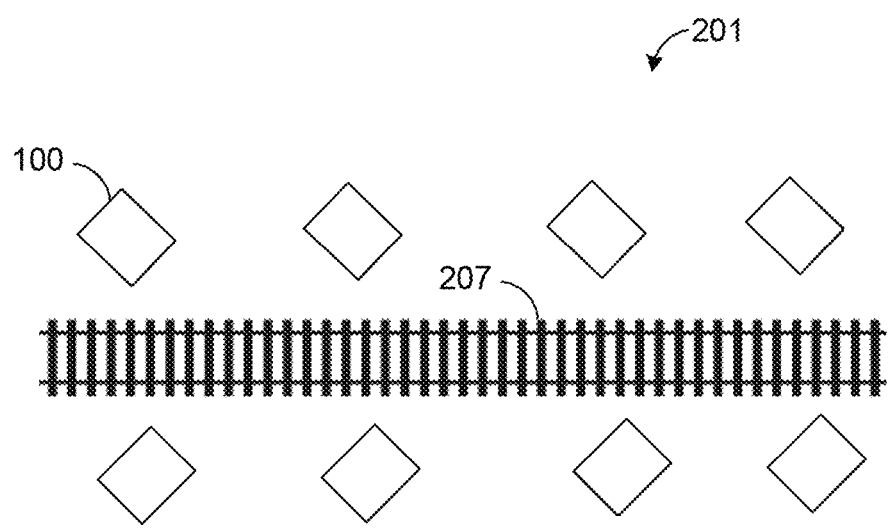
FIG. 2B illustrates an example placement of the ECPs along railroad tracks according to the various embodiments of the present disclosure.
Figure 2C:
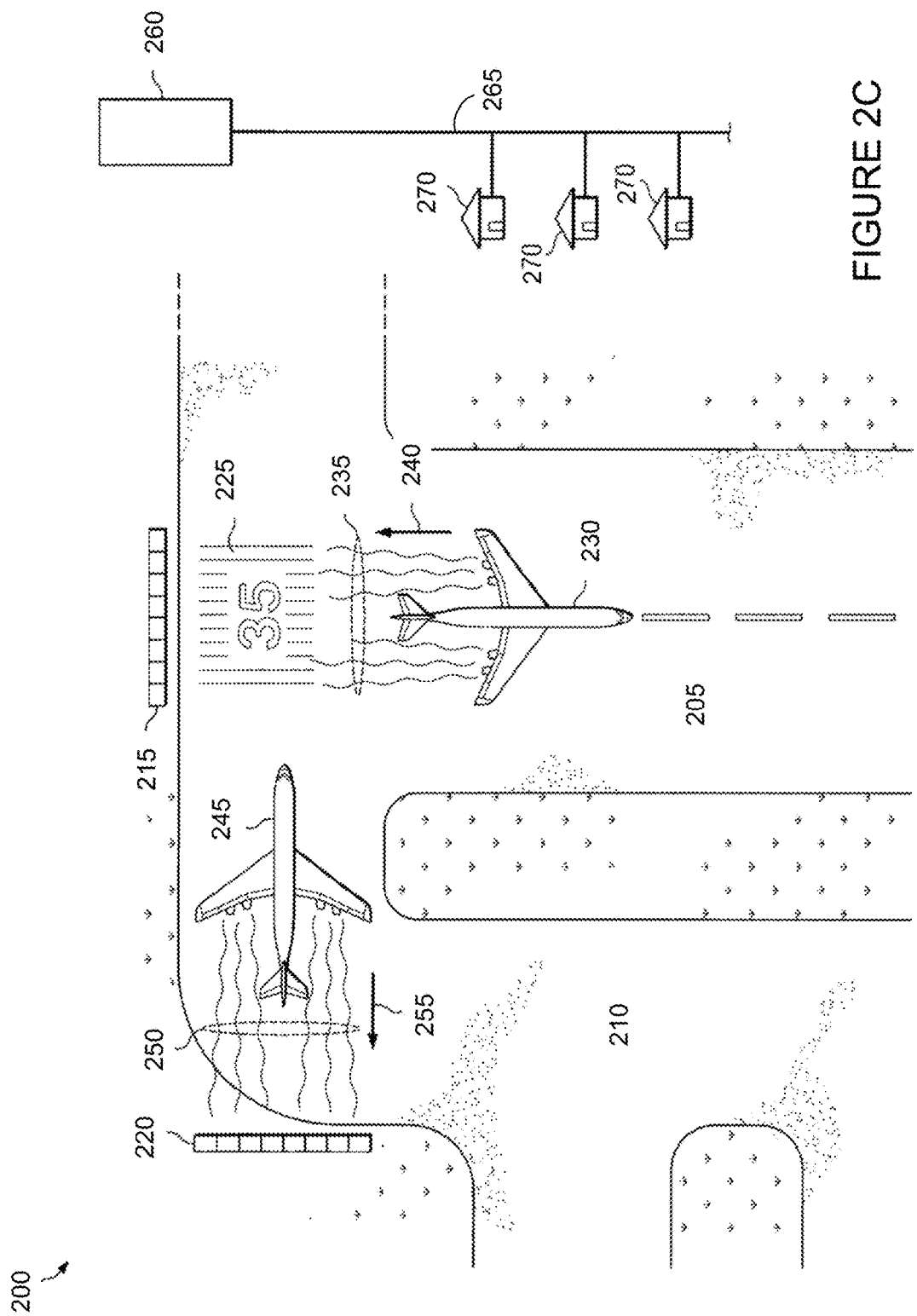
FIG. 2C illustrates an example airport runway and taxiway configuration and the placement of two groups of ECPs according to the various embodiments of the present disclosure.

FIG. 2A illustrates an example placement 200 of ECPs 100 around a helipad 206 according to the various embodiments of the present disclosure. FIG. 2B illustrates an example placement 201 of the ECPs 100 along railroad tracks 207 according to the various embodiments of the present disclosure. FIG. 2C illustrates an example airport runway and taxiway configuration 202 and the placement of two groups of ECPs 215 and 220 according to the various embodiments of the present disclosure. The embodiments of the placement 200 on the helipad 206 illustrated in FIG. 2A, the placement 201 along the railroad tracks 207 illustrates in FIG. 2B, and airport runway and taxiway configuration 202 illustrated in FIG. 2C are for illustration only. FIGS. 2A, 2B, and 2C do not limit the scope of this disclosure to any particular implementation of an ECP configuration.

FIG. 2A illustrates placement 200 of ECPs 100 around a helipad 206. As shown, the ECPs are positioned in a circle around the location where a helicopter would take off or land. ECPs could be placed in a complete circle or in a partial circle. For example, more ECPS could be positioned around the helipad 206, leaving only a space for entering and exiting the helicopter on the ground.

FIG. 2B illustrates placement 201 of ECPs 100 along railroad tracks 207. The ECPs are angled in a direction to capture the wind pushed off the train passing by. The ECPs can be located on both side of the track or one a single side of the track.

FIG. 2C illustrates two clusters of ECPs 215 and 220 strategically placed at two different positions on an airfield. In this example, the clusters of ECPs 215 and 220 are used to capture the man-made wind created by aircraft exhaust and convert that wind into electric energy.

As shown in FIG. 2C, first cluster 215 is arranged at the takeoff end 225 of runway 205. Thus the wind created by the engine man-made wind of jet 230 (together with any prevailing natural wind) creates an airflow 235 in the direction of arrow 240, which impacts the ECPs of cluster 215 to generate electric power. Similarly, second cluster 220 is positioned at the exhaust end of an engine run-up area on taxiway 210. The wind created by the engine exhaust of jet 245 (together with any prevailing natural wind) creates an airflow 250 in the direction of arrow 255, which impacts the ECPs of cluster 220 to generate electric power. It should be noted that the clusters may be arranged at any of a variety of advantageous locations about the airfield in order to harness man-made wind, or other natural or man-made airflows.

Other aspects and features may be incorporated into one or more of the various embodiments. For instance, as previously mentioned, one or more clusters may be mounted at various locations, such as various positions on an airfield. For instance, FIG. 2C illustrates a first cluster 215 and a second cluster 220. First cluster 215 may have associated therewith one or more storage devices or other electrical power transmission components. Similarly, second cluster 220 may have associated therewith one or more storage devices or other electrical power transmission components. Power from first cluster 215 may be transported by removing a full battery 120 or moving an ECP with a full battery 120 to a substation or warehouse 20. Power from second cluster 220 may be transported by removing a full battery 120 or moving an ECP with a full battery 120 to a substation or warehouse 20. Power may then be transmitted from the substation or warehouse via power transmission cable to power grid 265 and/or to facilities 70, or to other storage devices or electrical transmission devices, transmission components, or other electrical components as desired.

Figure 3A:
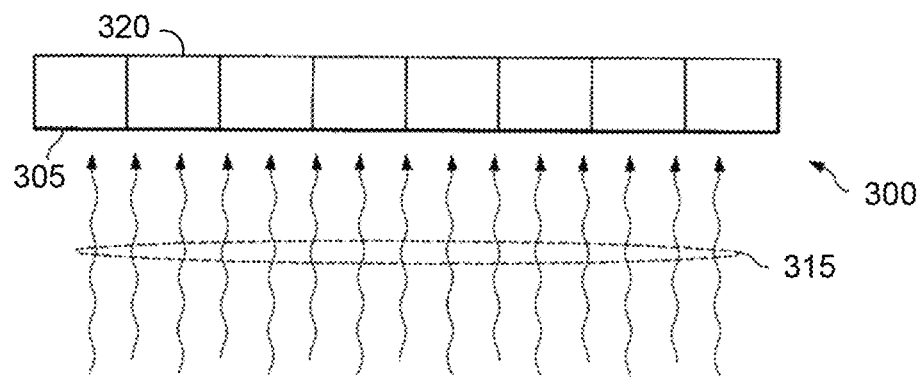
FIGS. 3A and 3B illustrate an example cluster of the ECPs for converting wind and solar power into electric energy according to various embodiments of the present disclosure.
Figure 3B:
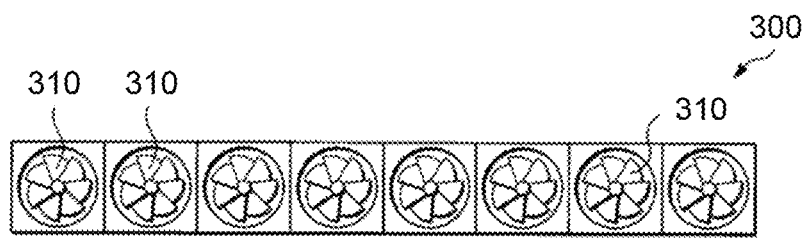

FIGS. 3A and 3B illustrate an example cluster 300 of the ECPs 305 for converting wind into electric energy according to various embodiments of the present disclosure. The embodiments of the cluster 300 illustrated in FIGS. 3A and 3B are for illustration only. FIGS. 3A and 3B do not limit the scope of this disclosure to any particular implementation of a cluster. For convenience of illustration, the ECPs 305 of FIG. 3B include a single turbine 310. But as described previously, the ECPs 305 could each include a plurality of turbines 310.

As shown, there is provided a cluster 300 comprising a plurality of ECPs 305. ECPs 305 may be provided as individual units, which may be arranged adjacent one another. In one example, the weight of the units keeps the units arranged adjacently. Alternatively, the units may be fixedly coupled together by any suitable coupling mechanism (not expressly shown). This might include, for example having one or more bolts extending outwardly from the side of one unit to fit in a corresponding slot provided on the side of an adjacent unit. Or, the units may be bolted together. Another possible connection mechanism might be a latch or bar overlapping a portion of the front, back, and/or top of two adjacent units. These are examples only, and it will be readily understood that any suitable coupling device or method may be employed to join the units together. As yet another alternative for keeping the units in position, the units may be placed on a base (not expressly shown). In one embodiment, a base is affixed at any, some, or all of the positions, such as the various potential positions on an airfield, where it is anticipated that one or more units might be installed. This might be achieved, for example, by affixing a metal base on a concrete footer. The metal base may be provided with preformed holes, or other appropriate receptacles, for receiving coupling mechanisms to affix the unit(s) to the base. Again, this is an example only, and many possibilities exist for a configuration employing a base. Again, it should be understood that the individual turbines, groups of turbines and/or turbine clusters may be transportable or fixed.

In the embodiment illustrated in FIGS. 3A and 3B, for example, there is shown a configuration comprising a single row of ECPs 305. Each unit has a turbine 136, or set of turbine blades, such as the sets shown in FIG. 3B. It should be understood that any of a variety of turbine devices may be used to receive wind. In one embodiment, the turbine blades comprise a high-strength plastic capable of withstanding high wind speeds and high rotational speeds. Any suitable material, however, may be used. In one embodiment, the blades are arranged in a pattern of four blades equally spaced around a central hub. It will be understood, however, that this is an example only and a variety of blade formations and configurations are possible.

As shown in FIG. 3A, the cluster 300 receives an airflow 315. As mentioned previously, in an airport environment, the airflow may be created by the man-made wind of an aircraft. This might be exhausted output from the engines of a jet airplane. The wind might be created by other sources, such as propellers of an aircraft. Also, the airflow might be partially or totally natural. For example, an airport might have a runway aligned so that planes are normally taking off in the direction of a prevailing wind. Thus, the man-made wind (or propeller wind) and the prevailing natural wind at the takeoff end of the runway might combine to create the overall airflow impacting the turbine cluster.

As the airflow 315 impacts the cluster 300, a portion of the airflow impacts one or more of the individual ECPs 305. Each of the ECPs 305 has an associated battery 120. As airflow 315 impacts a particular unit, it causes rotation of the turbine blades. This rotation in turn causes the ECP 305 to convert the wind energy into electricity to be stored in the battery 120. In the embodiment shown in FIG. 3A, each of the ECPs 305 is coupled to the neighboring ECP 320 using the energy transfer port 125. The captured energy can be stored in the individual batteries 120 of the ECPs 100 or can be transferred. Each ECP 305 can be configured separately on the storage protocols. For example, an ECP 305 located at the center of the cluster 300 might be more difficult to access. In this case, the center ECPs 305 can be configured to transfer all or a large portion of the captured energy to the ECPs 305 at the ends of the cluster. In certain embodiments, the ECPS 100 can transfer the electrical energy to a singly battery or bank of batteries associated with or connected to multiple ECPs.

In the embodiment with permanent batteries 120, the clusters 300 can be configured to transfer all capture energy to an ECP 305 at the end of the cluster 300. Once the battery or batteries are full on the ECP 305 at the end, the ECP 305 is removed for transfer of the energy to the grid and the other ECPs 305 can be shifted or a new ECP 305 can be inserted at the end of the cluster 300.

In certain embodiments, power generated from the ECPs 305 may be transmitted to a storage device (e.g., a battery or set of batteries), to a preexisting power grid, or through an arrangement of additional electrical power components to one or more power drains (e.g., houses in a neighborhood adjacent to the airport, or to airport facilities, or to an electrical system of a building on which the cluster has been installed). Thus, the power may be stored, or transmitted directly to one or more devices or facilities requiring electric power.

Figure 4:
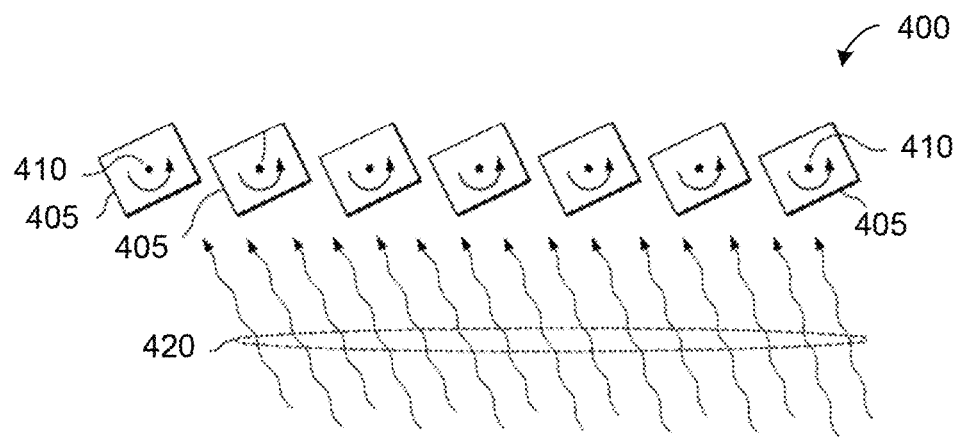
FIG. 4 illustrates an example cluster with rotated ECPs according to the various embodiments of the present disclosure.

FIG. 4 illustrates an example cluster 400 with rotated ECPs 405 according to the various embodiments of the present disclosure. The embodiment of the cluster 400 illustrated in FIG. 4 is for illustration only. FIG. 4 does not limit the scope of this disclosure to any particular implementation of a cluster 400.

In the illustrated embodiment, the ECPs 405 are angled along an air flow path 420. As an example, the angled air flow 420 could occur along the sides of a runway as a plane is taxiing or taking off, along train tracks, helipads, tunnels, etc. Each ECP 405 can be positioned the same or different amount about a point 410 depending on the profile of the air flow path 420. While taxiing, the plane moves at a more constant rate generating a more uniform profile of the air flow path. In this situation, the angle of rotation of the position compared to the runway can be similar for the entire cluster 400. While taking off, a plane is increasing in velocity generating a profile with a changing angle. In this situation the ECPs 405 further down the runway can be positioned more or less depending on the angle of the air flow path 420 at that part of the profile.

Figure 5:
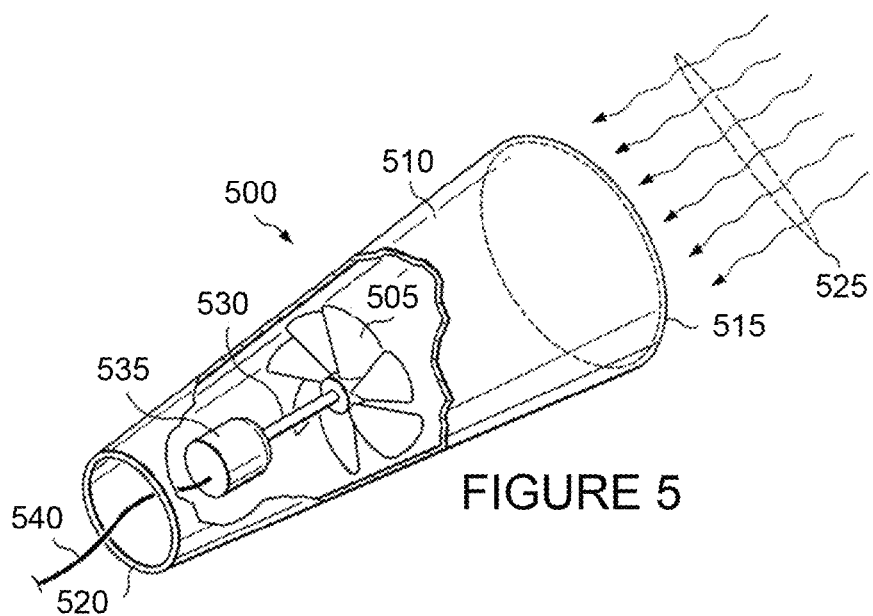
FIG. 5 illustrates an example turbine according to the various embodiments of the present disclosure.

FIG. 5 illustrates an example turbine 500 according to the various embodiments of the present disclosure. The embodiment of the turbine 500 illustrated in FIG. 5 is for illustration only. FIG. 5 does not limit the scope of this disclosure to any particular embodiment of a turbine.

As shown in FIG. 5, a turbine 500 may be configured as a pod having a rotor 505 housed therein. Pod body 510 extends from a first (intake) end 515 to a second (output) end 520. The intake end 515 is the circular portion at the interior of the specialized funnel shell 105, illustrated in FIG. 1. The air flow 525 that passes through the turbine 500 out the output end 520 can be output in any direction. Such manipulation of the air flow 525 can be focused to a secondary ECP 100 located behind. For example, in the ECP arrangement illustrated in FIG. 7, the single ECPs 715 down the runway can focus the man-made wind to the set of ECPS 720. And the set of ECPs 720 can redirect the man-made wind to the array of ECPS 710 at the end of the runway 700. This recapture of air flow 525 exiting the turbine 500 can enhance the energy capturing ability of the ECPs 100.

In one example, the turbine 500 is tapered so that a cross-sectional area of the pod body 510 decreases from the input end 515 to the output end 520. Among other things, this produces a nozzle effect for the airflow passing through the pod body 510. Airflow 525 generated from jet exhausts during takeoff can be as great as 200 mph or more at 150 feet or more from the end of the jet. The funnel effect of the pod body 510 can increase the speed of the airflow impacting the rotor 505, thereby increasing the corresponding amount of electric power being generated by the respective turbine 500. In the example shown, the pod body 510 also houses shaft 530 and generator 535. The air flow 525 impacting the rotor 505 causes the rotor 505 to rotate the shaft 530. The rotation of the shaft causes the generator 535 to translate the wind power into electric energy. A power transfer cable 540 extends from the output end 520 of the pod body 510. The electrical energy converted by the generator 535 is transmitted through the power transfer cable 540 either to the battery 120 or to the energy transfer port 125.

Figure 6:
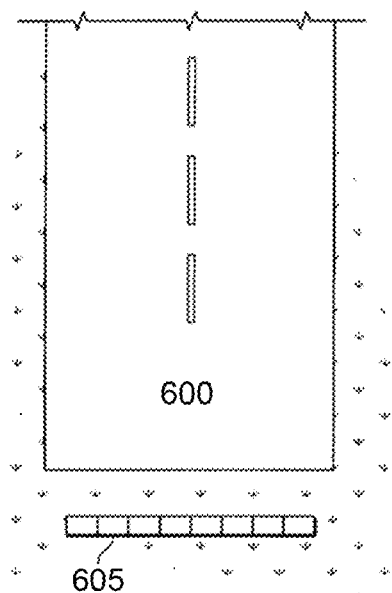
FIGS. 6 and 7 illustrate example clusters of ECPs located at the end of a runway according to the various embodiments of the present disclosure.
Figure 7:
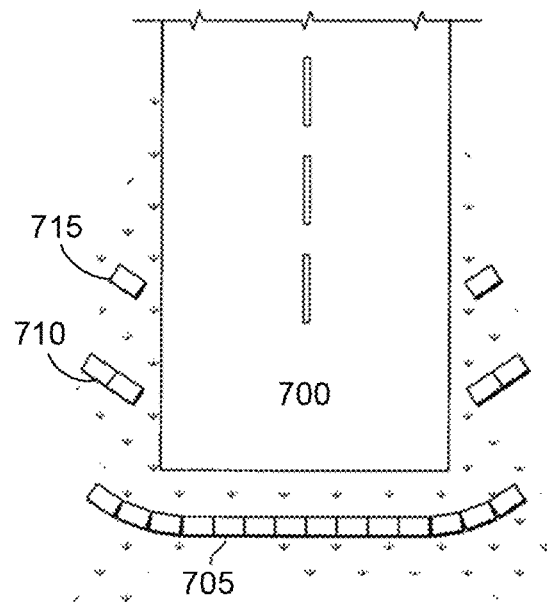

FIGS. 6 and 7 illustrate example clusters 605 and 705 of ECPs 100 located at the end of a runway 600 and 700 according to the various embodiments of the present disclosure. The embodiments of the clusters 605 and 705 illustrated in FIGS. 6 and 7 are for illustration only. FIGS. 6 and 7 do not limit the scope of this disclosure to any particular implementation of a cluster of ECPs.

ECPs 100 may also be arranged behind one another or in front of one another with respect to the direction of airflow. Likewise, turbines may be arranged above or below one another with respect to the ground. Any configuration may be used as desired in this regard. In one example, as shown in FIG. 6, a cluster 605 is provided in which each turbine or group of turbines is arranged to be substantially axially aligned with a centerline of a runway 600. Thus, the axes of the turbines are aligned with the flow of man-made wind from a jet lined up on the runway as the exhaust exits the engines.

In an alternate configuration, as shown in FIG. 7, a cluster 705 is arranged so that some of the turbines are axially aligned with the runway 700. However, other turbines are positioned so that they will be axially aligned with portions of the jet exhaust flow which diverge from parallel with the runway. In other words, as the exhaust, and winds created by the exhaust, travel away from the jet's engines, a certain portion of the flow can be expected to shift to a direction that is no longer parallel with the runway. One or more non-parallel turbines (i.e., toward the outer ends of the cluster) are preferably aligned with these portions of the airflow. Also, additional turbines may be positioned along the edges of the runway, as illustrated, to capture divergent airflow as the jet moves along the runway. In another example (not expressly shown), one or more turbines may be arranged on an exhaust deflector such as those found at the end of certain runways or adjacent to hangars or repair bays. These deflectors may exist, for instance, in situations where the man-made wind would otherwise negatively impact an adjacent structure or property. Such deflector structures are used to divert the man-made wind upward and away from the ground.

Figure 8:
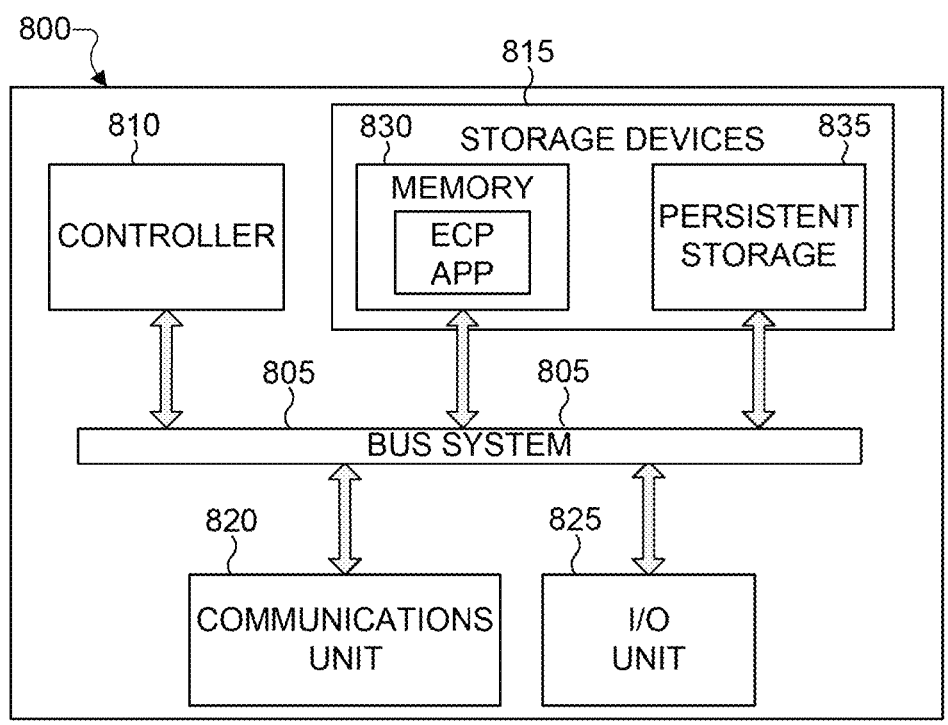
FIGS. 8 and 9 illustrate example devices in a computing system according to this disclosure.
Figure 9:
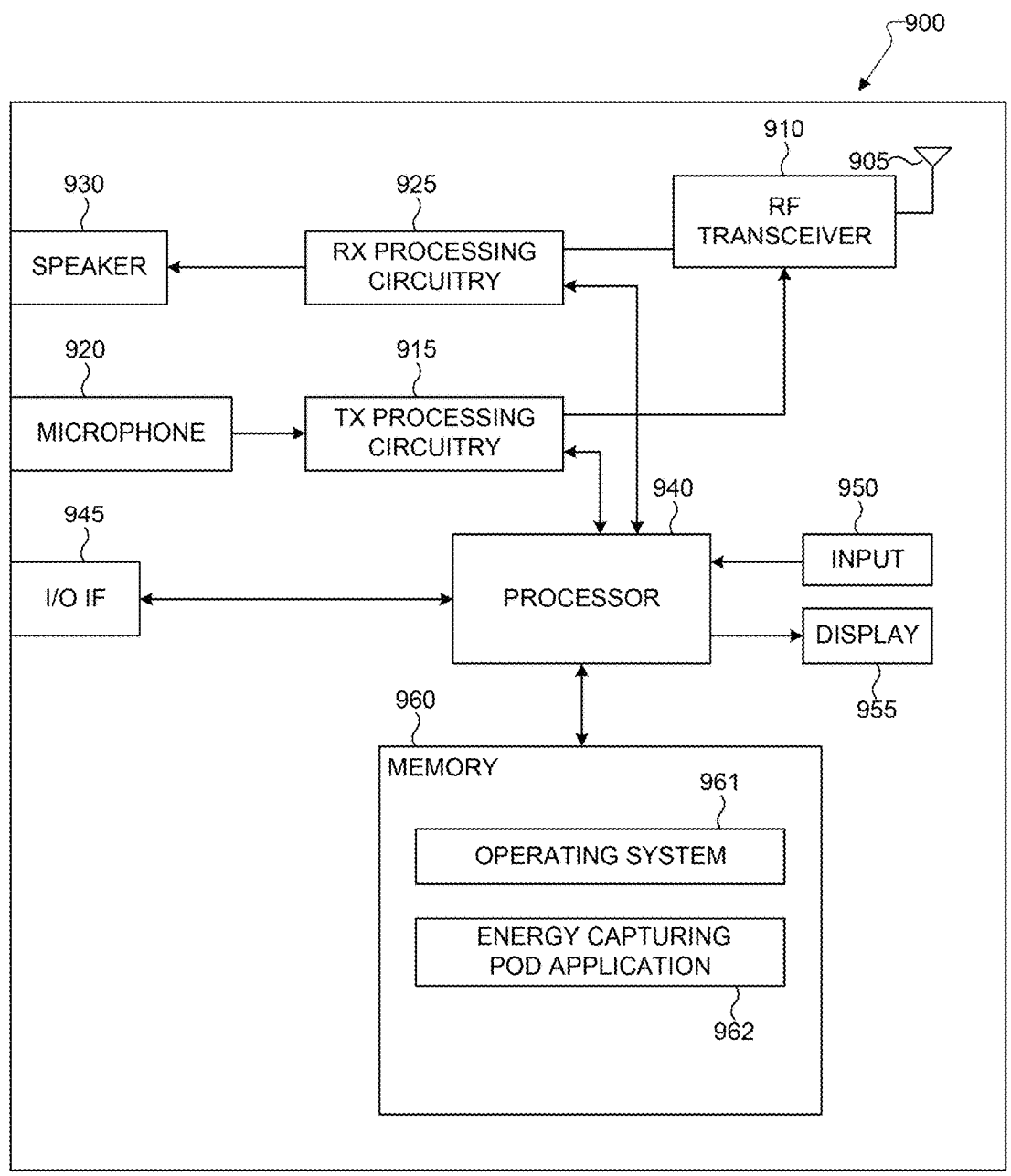

FIGS. 8 and 9 illustrate example devices in a computing system according to this disclosure. In particular, FIG. 8 illustrates an example ECP server 800, and FIG. 9 illustrates an example electronic device 900. The embodiments of the server 800 illustrated in FIG. 8 and the electronic device 900 illustrated in FIG. 9 are for illustration only. FIGS. 8 and 9 do not limit the scope of this disclosure to any particular embodiment of a server or an electronic device.

As shown in FIG. 8, the server 800 includes a bus system 805, which supports communication between at least one processing device 810, at least one storage device 815, at least one communications unit 820, and at least one input/output (I/O) unit 825.

The processing device 810 executes instructions that may be loaded into a memory 830. The processing device 810 may include any suitable number(s) and type(s) of processors or other devices in any suitable arrangement. Example types of processing devices 810 include microprocessors, microcontrollers, digital signal processors, field programmable gate arrays, application specific integrated circuits, and discreet circuitry.

The memory 830 and a persistent storage 835 are examples of storage devices 815, which represent any structure(s) capable of storing and facilitating retrieval of information (such as data, program code, and/or other suitable information on a temporary or permanent basis). The memory 830 may represent a random access memory or any other suitable volatile or non-volatile storage device(s). The memory 830 includes an ECP application 840. The persistent storage 835 may contain one or more components or devices supporting longer-term storage of data, such as a ready only memory, hard drive, flash memory, or optical disc.

The ECP application 840 includes different modes for managing a plurality of ECPs 100 across an airport or a plurality of airports. The ECP application 840 includes operations that are described in detail in FIG. 10.

The communications unit 820 supports communications with other systems or devices. For example, the communications unit 820 could include a network interface card or a wireless transceiver facilitating communications over a network. The communications unit 820 may support communications through any suitable physical or wireless communication link(s).

The I/O unit 825 allows for input and output of data. For example, the I/O unit 825 may provide a connection for user input through a keyboard, mouse, keypad, touchscreen, or other suitable input device. The I/O unit 825 may also send output to a display, printer, or other suitable output device.

As described in more detail above, the server 800 manages operation of a plurality of ECPs 100.

As shown in FIG. 9, the electronic device 900 includes an antenna 905, a radio frequency (RF) transceiver 910, transmit (TX) processing circuitry 915, a microphone 920, and receive (RX) processing circuitry 925. The electronic device 900 also includes a speaker 930, a processor 940, an input/output (I/O) interface (IF) 945, an input 950, a display 955, and a memory 960. The memory 960 includes an operating system (OS) program 961 and one or more applications 962.

The RF transceiver 910 receives, from the antenna 905, an incoming RF signal transmitted by another component in a system. The RF transceiver 910 down-converts the incoming RF signal to generate an intermediate frequency (IF) or baseband signal. The IF or baseband signal is sent to the RX processing circuitry 925, which generates a processed baseband signal by filtering, decoding, and/or digitizing the baseband or IF signal. The RX processing circuitry 925 transmits the processed baseband signal to the speaker 930 (such as for voice data) or to the processor 940 for further processing (such as for web browsing data).

The TX processing circuitry 915 receives analog or digital voice data from the microphone 920 or other outgoing baseband data (such as web data, e-mail, or interactive video game data) from the processor 940. The TX processing circuitry 915 encodes, multiplexes, and/or digitizes the outgoing baseband data to generate a processed baseband or IF signal. The RF transceiver 910 receives the outgoing processed baseband or IF signal from the TX processing circuitry 915 and up-converts the baseband or IF signal to an RF signal that is transmitted via the antenna 905.

The processor 940 can include one or more processors or other processing devices and execute the OS program 961 stored in the memory 960 in order to control the overall operation of the electronic device 900. For example, the processor 940 could control the reception of forward channel signals and the transmission of reverse channel signals by the RF transceiver 910, the RX processing circuitry 925, and the TX processing circuitry 915 in accordance with well-known principles. In some embodiments, the processor 940 includes at least one microprocessor or microcontroller.

The processor 940 is also capable of executing other processes and programs resident in the memory 960. The processor 940 can move data into or out of the memory 960 as required by an executing process. In some embodiments, the processor 940 is configured to execute the applications 962 based on the OS program 961 or in response to signals received from external devices or an operator. The processor 940 is also coupled to the I/O interface 945, which provides the electronic device 900 with the ability to connect to other devices such as laptop computers and handheld computers. The I/O interface 945 is the communication path between these accessories and the processor 940.

The processor 940 is also coupled to the input 950 and the display unit 955. The operator of the electronic device 900 can use the input 950 to enter data into the electronic device 900. For example, the input 950 may be a keypad, touchscreen, button, etc. The display 955 may be a liquid crystal display or other display capable of rendering text and/or at least limited graphics, such as from web sites.

The memory 960 is coupled to the processor 940. Part of the memory 960 could include a random access memory (RAM), and another part of the memory 960 could include a flash memory or other read-only memory (ROM). The memory also includes an ECP application 962 for regulating a transfer of the electrical energy and monitoring a speed of a turbine and a charge level of a battery.

The ECP application 962 on the electronic device 900 includes the operations described below in FIG. 10.

As described in more detail below, the electronic device 900 controls an ECP capturing wind energy, regulating a transfer of the electrical energy and monitoring a speed of a turbine and a charge level of a battery.

Although FIGS. 8 and 9 illustrate examples of devices in a computing system, various changes may be made to FIGS. 8 and 9. For example, various components in FIGS. 8 and 9 could be combined, further subdivided, or omitted and additional components could be added according to particular needs. As a particular example, the processor 940 could be divided into multiple processors, such as one or more central processing units (CPUs) and one or more graphics processing units (GPUs). Also, while FIG. 9 illustrates the electronic device 900 configured as a mobile telephone or smartphone, electronic devices could be configured to operate as other types of mobile or stationary devices. In addition, as with computing and communication networks, electronic devices and servers can come in a wide variety of configurations, and FIGS. 8 and 9 do not limit this disclosure to any particular electronic device or server.

Figure 10:
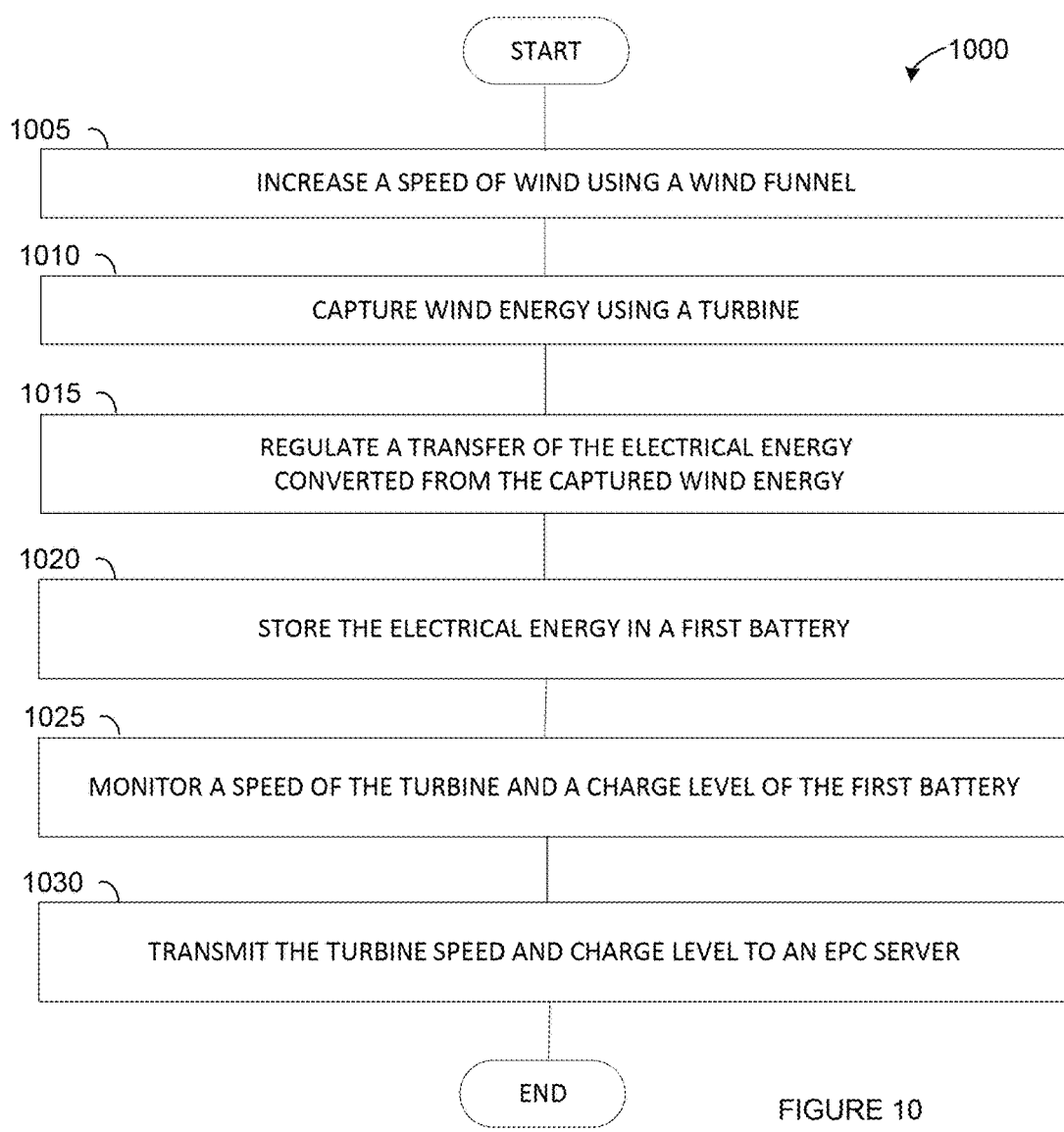
FIG. 10 illustrates an exemplary process for controlling an ECP for capturing energy from wind according to various embodiments of the present disclosure.

FIG. 10 illustrates an exemplary process 1000 for controlling an ECP for capturing energy from wind according to various embodiments of the present disclosure. For example, the process depicted in FIG. 10 may be performed by an ECP 100 illustrated in FIG. 1. The process may also be implemented by an electronic device 900 illustrated in FIG. 9.

In operation 1005, the ECP increases a speed of wind using a specialized funnel shell. The specialized funnel shell is located upwind of the turbine. In certain embodiments the specialized funnel shell is a Venturi nozzle. The greater the speed of the wind, the more wind energy is captured.

In operation 1010, the ECP captures wind energy using a turbine. The turbine is manufactured of materials that can accept high speed wind velocity. The ECP can include a plurality of turbines. Each turbine includes a generator that receives rotational energy created by the wind energy spinning the rotor and generates electrical energy.

In operation 1015, the ECP regulates a transfer of the electrical energy converted from the captured wind energy. The ECP can transfer the electrical energy to a first battery, a second battery, or an energy transfer port. The ECP can transfer the electrical energy to a single component or divert different amounts of the electrical energy to different components. For example, a first portion can be transmitted to the first battery, the second portion can be transmitted to the second battery, and a third portion can be exported out the energy transfer port.

In certain embodiments, a number of ECPs are connected in series. Each ECP includes at least two energy transfer ports. A first ECP in a series can export electrical energy to a second ECP. The second ECP can store the received electrical energy from the first ECP or further export to a third ECP.

The series of ECPs can be control to divert electrical energy in different ways. The instructions can be manually programmed at each ECP or controlled by an ECP server. The ECPs can be controlled to direct electrical energy to a closest end of a series of ECPs or can be controlled to direct the electrical energy to a single end. When the amount of electricity being transferred through an ECP is too much for the connection between ECPs, the ECP can store the excess electrical energy in the first battery or the second battery.

In operation 1020, the ECP stores the electrical energy in a first battery. The first battery stores electrical energy generated by the turbine capturing wind energy. The first battery can be removed or replaced, usually when fully charged.

In certain embodiments, the ECP includes a second battery that can be removed. The ECP can store electrical energy in the second battery. The second battery can be the same as the first battery or can be a different size. For example, the second battery could be much smaller design to receive the electrical energy during an amount of time to replace the first battery.

In operation 1025, the ECP monitors a speed of the turbine and a charge level of the first battery. The speed of the turbine is monitored to ensure the safety. Excessive speeds of turbines cause the turbine to overheat resulting in a possible explosion. The speed of the turbine is monitored at both the ECP and the ECP server. The turbine can be programmed to brake when reaching a safety threshold.

The charge level of the first battery and second battery are monitored for maximum energy capturing of the wind. When a first battery is fully charged, a notification or alarm is triggered at the ECP and the ECP server. The notification informs a user that the first battery needs to be removed for transfer to the grid or replaced by an empty battery. When the first battery is fully charged the ECP directs the electrical energy to a second battery or to the energy transfer port. When the first battery is returned or replaced by an empty battery, the ECP can resume standard charging operations.

In certain embodiments, the second battery remains charging even if the first battery is returned empty or replaced by an empty battery. When the second battery is fully charged, a second notification or alarm indicating the second battery is fully charged is triggered at the ECP and the ECP server. The second notification or alarm indicates that the second battery is ready to be removed for transfer to the grid or replaced by an empty battery.

In operation 1030, the ECP transmits the turbine speed and charge level to an ECP server. The turbine speed and charge level of the ECP are displayed for a user to determine when to shut down the ECP or replace the battery.

Although FIG. 10 illustrates an example process 1000 for controlling an ECP for capturing energy from the wind, respectively, various changes could be made to FIG. 10. For example, while shown in a series of steps, various steps in each figure could overlap, occur in parallel, occur in a different order, or occur multiple times.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A specialized funnel shell for accelerating wind, the specialized funnel shell comprising:
    a horizontal top airfoil that is inverted and substantially linear along a width of the specialized funnel shell,
    a horizontal bottom airfoil that is substantially linear along the width of the specialized funnel shell, and
    two vertical side airfoils that are substantially linear along a height of the specialized funnel shell.

2. The specialized funnel shell of claim 1, wherein ends of the horizontal top airfoil and the two vertical side airfoils meet as corners.

3. The specialized funnel shell of claim 1, wherein ends of the horizontal bottom airfoil and the two vertical side airfoils meet as corner.

4. The specialized funnel shell of claim 1, further comprising:
a first battery configured to store electrical energy; and
a processor coupled to the first battery and configured to:
detect when the first battery is fully charged or removed, and
transfer the electrical energy to a second battery when the first battery is fully charged or removed.

5. The specialized funnel shell of claim 4, further comprising an energy transfer port configured to export the electrical energy.

6. The specialized funnel shell of claim 5, wherein the processor is further configured to transfer the electrical energy to the energy transfer port for exporting when the first battery is fully charged or removed.

7. An energy capturing pod (ECP) for accelerating air, the ECP comprising:
a turbine; and
a specialized funnel shell comprising:
a horizontal top surface that is inverted and substantially linear along a width of the specialized funnel shell,
a horizontal bottom surface that is substantially linear along the width of the specialized funnel shell, and
two vertical side surfaces that are substantially linear along a height of the specialized funnel shell.

8. The ECP of claim 7, wherein ends of the horizontal top surface and the two vertical side surfaces meet as corners.

9. The ECP of claim 7, wherein ends of the horizontal bottom surface and the two vertical side surfaces meet as corners.

10. The ECP of claim 7, further comprising:
a first battery configured to store electrical energy generated by the turbine;
a processor coupled to the first battery and configured to:
detect when the first battery is fully charged or removed; and
transfer the electrical energy to a second battery when the first battery is fully charged or removed.

11. The ECP of claim 10, further comprising an energy transfer port configured to export the electrical energy.

12. The ECP of claim 11, wherein the processor is further configured to transfer the electrical energy to the energy transfer port for exporting when the first battery is fully charged or removed.

13. The ECP of claim 11, wherein the processor is further configured to:
receive, from an ECP server, instructions for regulating a transfer of the energy;
transfer the electrical energy to the first battery and the energy transfer port according to the instructions received from the ECP server.

14. An energy capturing pod (ECP) system for capturing wind, the ECP system comprising:
an ECP server configured to monitor and control a plurality of ECPs; and
the plurality of ECPS, each of the ECPs comprising:
a turbine; and
a specialized funnel shell comprising:
a horizontal top airfoil that is inverted and substantially linear along a width of the specialized funnel shell,
a horizontal bottom airfoil that is substantially linear along the width of the specialized funnel shell, and
two vertical side airfoils that are substantially linear along a height of the specialized funnel shell.

15. The ECP system of claim 14, wherein ends of the horizontal top airfoil and the two vertical side airfoils meet as corners.

16. The ECP system of claim 14, wherein ends of the horizontal bottom airfoil and the two vertical side airfoils meet as corner.

17. The ECP system of claim 14, each of the ECPs further comprising:
a first battery configured to store electrical energy generated by the turbine; and
a processor coupled to the first battery and configured to:
detect when the first battery is fully charged or removed, and
transfer the electrical energy to a second battery when the first battery is fully charged or removed.

18. The ECP system of claim 17, further comprising an energy transfer port configured to export the electrical energy.

19. The ECP system of claim 18, wherein the processor is further configured to transfer the electrical energy to the energy transfer port for exporting when the first battery is fully charged or removed.

20. The ECP system of claim 18, wherein the processor is further configured to:
receive, from the ECP server, instructions for regulating a transfer of the energy;
transfer the electrical energy to the first battery and the energy transfer port according to the instructions received from the ECP server.

* * * * *